United States Patent
Aliverti et al.

(10) Patent No.: US 7,836,173 B2
(45) Date of Patent: Nov. 16, 2010

(54) ACCESS MONITORING AND MANAGEMENT SYSTEM, RELATED METHOD AND INFORMATICS PRODUCT

(75) Inventors: Adriano Aliverti, Busto Arsizio (IT);
Giuseppe Migliasso, Casalborgone (IT)

(73) Assignee: Microntel S.p.A., San Mauro Torinese (IT)

( * ) Notice: Subject to any disclaimer, the term of this patent is extended or adjusted under 35 U.S.C. 154(b) by 114 days.

(21) Appl. No.: 11/814,573

(22) PCT Filed: Jan. 18, 2006

(86) PCT No.: PCT/IB2006/000184
§ 371 (c)(1), (2), (4) Date: Nov. 15, 2007

(87) PCT Pub. No.: WO2006/079920
PCT Pub. Date: Aug. 3, 2006

(65) Prior Publication Data
US 2008/0133740 A1      Jun. 5, 2008

(30) Foreign Application Priority Data
Jan. 27, 2005   (IT)   .......................... TO2005A0047

(51) Int. Cl.
*G06F 15/173* (2006.01)
*G06F 15/16* (2006.01)

(52) U.S. Cl. ...................................... 709/224; 709/229

(58) Field of Classification Search ................. 709/223, 709/224, 229; 726/2, 27; 715/760
See application file for complete search history.

(56) References Cited

U.S. PATENT DOCUMENTS

| 6,363,351 | B1 | 3/2002 | Moro |
| 6,477,434 | B1* | 11/2002 | Wewalaarachchi et al. .... 700/83 |
| 7,421,491 | B2* | 9/2008 | Tameda et al. .............. 709/224 |
| 2004/0093309 | A1 | 5/2004 | Nakamura et al. |

FOREIGN PATENT DOCUMENTS

| WO | 01/63466 A2 | 8/2001 |
| WO | 01 84504 | 11/2001 |
| WO | 02 065358 | 8/2002 |

* cited by examiner

*Primary Examiner*—Yemane Mesfin
(74) *Attorney, Agent, or Firm*—Oblon, Spivak, McClelland, Maier & Neustadt, L.L.P.

(57) ABSTRACT

An access monitoring and management system includes at least one set of access terminals associated with a first communication network and an application server also associated with the first communications network for exchanging information. The server includes a real-time management module configured to exchange event information with the set of access terminals over the first communications network and a synoptic module configured to receive the event information from the real-time management module and to publish the event information on one or more monitoring user terminals over an Internet-type network.

22 Claims, 5 Drawing Sheets

ACCESS MONITORING AND MANAGEMENT SYSTEM, RELATED METHOD AND INFORMATICS PRODUCT

FIELD OF INVENTION

The present invention relates to access monitoring and management techniques, and it has been developed by paying specific attention to possible applications to access control procedures related to clocking in and presence check systems, in particular comprising passage controls. The scope of the invention however extends to any event recording and signaling systems where the conditions described below occur.

DESCRIPTION OF THE BACKGROUND ART

Access control systems are used, in general, for controlling the access of personnel to workplaces, e.g. through stamping apparatus, and/or to restricted areas. The access control system must grant and record the access to the authorized people and deny the access to unauthorized people.

The latest access control systems comprise a plurality of entrance controls, e.g. devices located at various access points in a firm or factory, being integrated into or associated with terminals as well as connected to one another and to a monitoring center by means of communication networks. Information relating to representative events of the access is exchanged over such communication networks. This information is used for checks involving comparisons with and alterations to information contained in databases implemented in computers being also associated with the communication networks. As said, there are also monitoring centers provided with terminals associated with the network in order to allow operators to monitor and check events related to access.

In order to ensure compliance with severe security standards, such access monitoring and control systems require that the detection and the control of the events happening in succession at the different access network nodes are performed as close to real time as possible. This real-time monitoring goal is however difficult to attain in a network architecture, especially without using highly specialized or dedicated hardware equipment and software management protocols.

OBJECT AND BRIEF DESCRIPTION OF THE INVENTION

The present invention aims at solving the above-described problem and at proposing a solution which allows to carry out real-time monitoring through non-specialized or non-dedicated hardware equipment and software management protocols.

In accordance with the present invention, this object is achieved by means of a system incorporating the features of the annexed claims, which form an integral part of the technical teaching of the invention.

The present invention also relates to a corresponding method, as well as to an informatics product which may be implemented in the memory of at least one computer and comprising portions of software code in order to execute the above method. In this frame, the reference to such an informatics product is to be understood as a reference to 3 computer-readable means containing instructions for controlling a computer system for the purpose of coordinating the implementation of the method according to the invention. The reference to "at least one computer" is meant to highlight the possibility of implementing the present invention in a distributed and/or modular manner.

BRIEF DESCRIPTION OF THE DRAWINGS

The invention will now be described by way of non-limiting example with reference to the annexed drawings, wherein.

DETAILED DESCRIPTION OF EXAMPLES OF EMBODIMENTS OF THE INVENTION

In brief, the invention proposes an access monitoring and management system and a corresponding monitoring method which associate a set of access terminals over a communication network and which monitor, through one or more remote monitoring terminals, events occurring at said access terminals. For monitoring it is utilized an application server, which is interfaced on one side with the communication network of the access terminals and on the other side with the remote monitoring terminals over an Internet-type network. The application server, according to an aspect of the invention, comprises a synoptic module for publishing events on the remote monitoring terminals, which exchanges information with a real-time management module, and a database for SCADA (Supervisory Control And Data Acquisition) events. The real-time management module is dedicated to the fast management of the transactions with the access terminals and the database. The system is completed by a passage module exchanging information with said real-time management module and said database as far as the management of personal data events is concerned.

Figure 1:
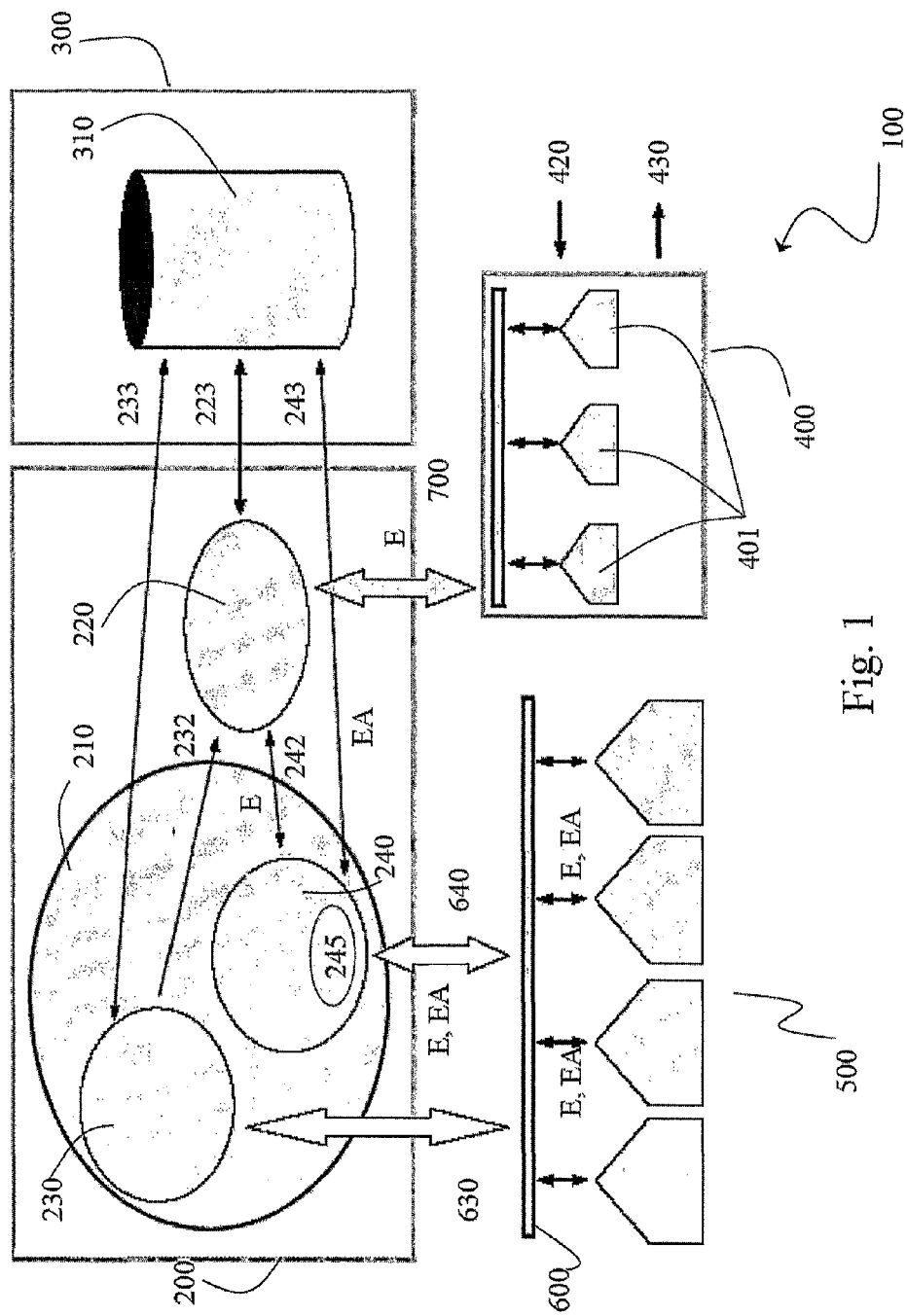
FIG. 1 shows an architecture of an access monitoring and management system according to the invention.

FIG. 1 illustrates a basic diagram of an architecture of an access monitoring and management system, designated as a whole 100.

This system 100 comprises an access system 400, comprising a plurality of access terminals 401. Said access terminals 401 are low-cost proprietary embedded devices being compact in size and having a particularly stylish design. The access terminals 401 are also equipped with a plurality of interfaces which allow them to be easily connected both to the communication network 700 and to optional external auxiliary identification devices.

The access terminals 401 comprise inputs 420 related to signals coming primarily from check passages, but possibly also from door sensors or technologic alarms of various kind. The access terminals 401 also comprise outputs 430 related to signals for managing the passage and, moreover, to alarm signals and anti-intrusion commands. In a preferred version, the access terminals 401 are Karpos Kompact terminals which collect, check and transmit information relating to personnel presence detection, production data and access control.

The access system 400 has its access terminals 401 connected to a communication network 700 through a proprietary multi-platform encrypted protocol called MicronNet.

An application server 200, i.e. a host computer which provides processing services to users or nodes for remote access, is connected to said communication network 700. Said application server 200 is also connected to an Intranet network 600. More in general, said network 600 is configured as an Internet-type network, i.e. a computer network using the TCP/IP protocol.

A plurality of user terminals 500, in particular personal computers equipped with navigation programs complying with the Internet Protocol, or Internet browsers, is associated with the Intranet network 600.

Said application server 200 comprises an Internet services module 210, which in turn includes a first access management module 230 in order to allow updating of personal data, time ranges, profiles in a database 310 through the user terminals 500, and a synoptic module 240.

The application server 200 also comprises a real-time management module 220, which is interfaced with the communication network 700.

The access management module 230 sends and exchanges personal data events to/with the real-time management module 220 over a line 232, whereas the synoptic module 240 exchanges SCADA events with the same real-time management module 220 over a line 242. The modules of the application server 200 are preferably implemented by using technology of the Microsoft .NET type.

The access management module 230 is then interfaced with the Internet network 600 through a connection 630, which allows the user terminals 500 to read, modify and set personal data in a database server 300.

Beside managing entrance access profiles, the access management module 230 has an extensive reporting resource such to allow the analysis of all the transit conditions which have occurred.

In fact, the access monitoring and management system 100 is also equipped with a database server 300 containing the database 310 of the events. Said database server 300, through a series of connections 223, 233, 243, exchanges signals relating to events and settings, as detailed below, with the application server 200, respectively with the access management module 230 over a line 233, with the synoptic module 240 over a line 243, and with the real-time management module 220 over a line 223.

Figure 2:
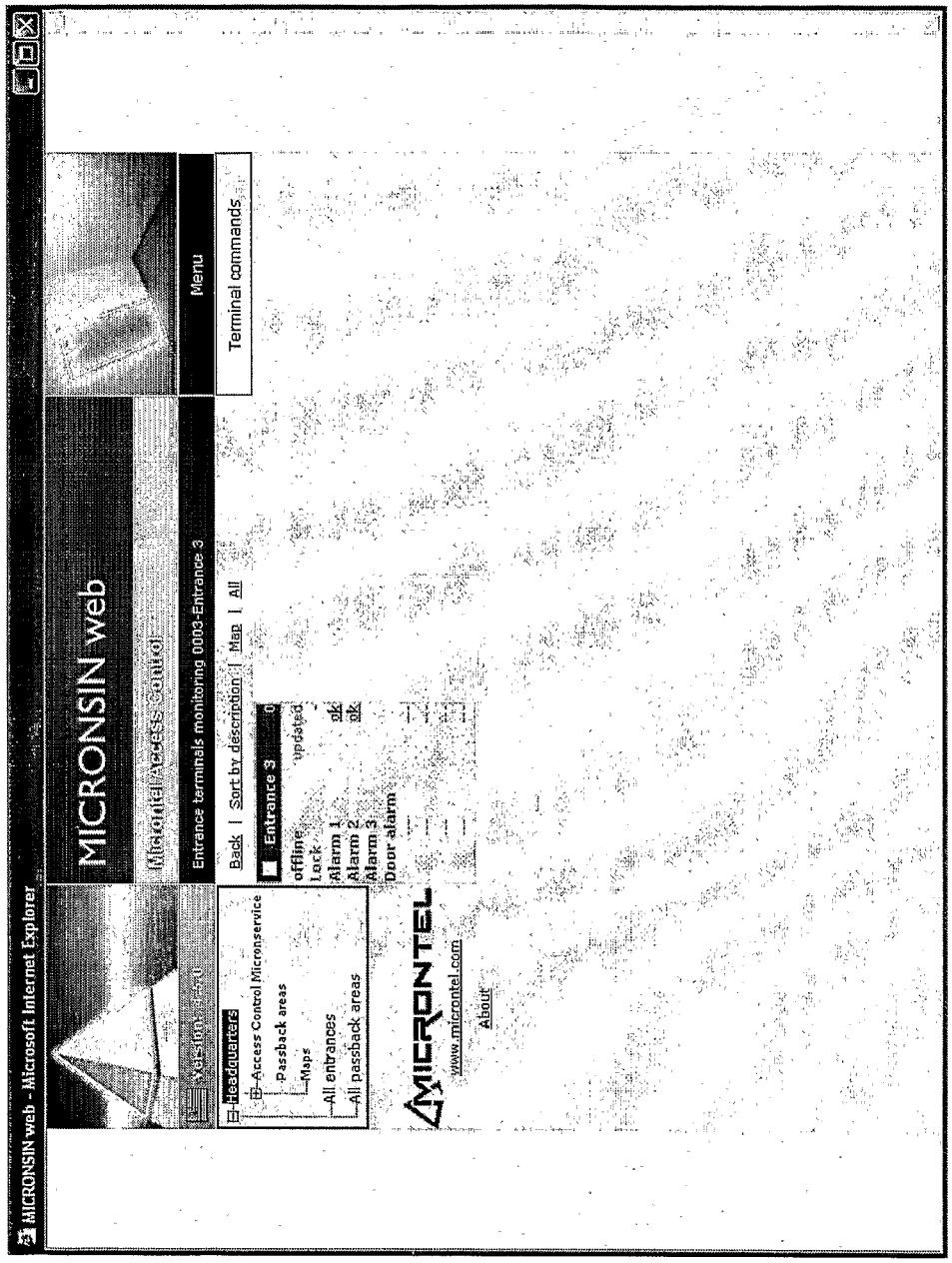
FIG. 2 shows a screen processed by the informatics product implementing the method according to the invention, representing a monitoring situation related to an entrance.
Figure 3:
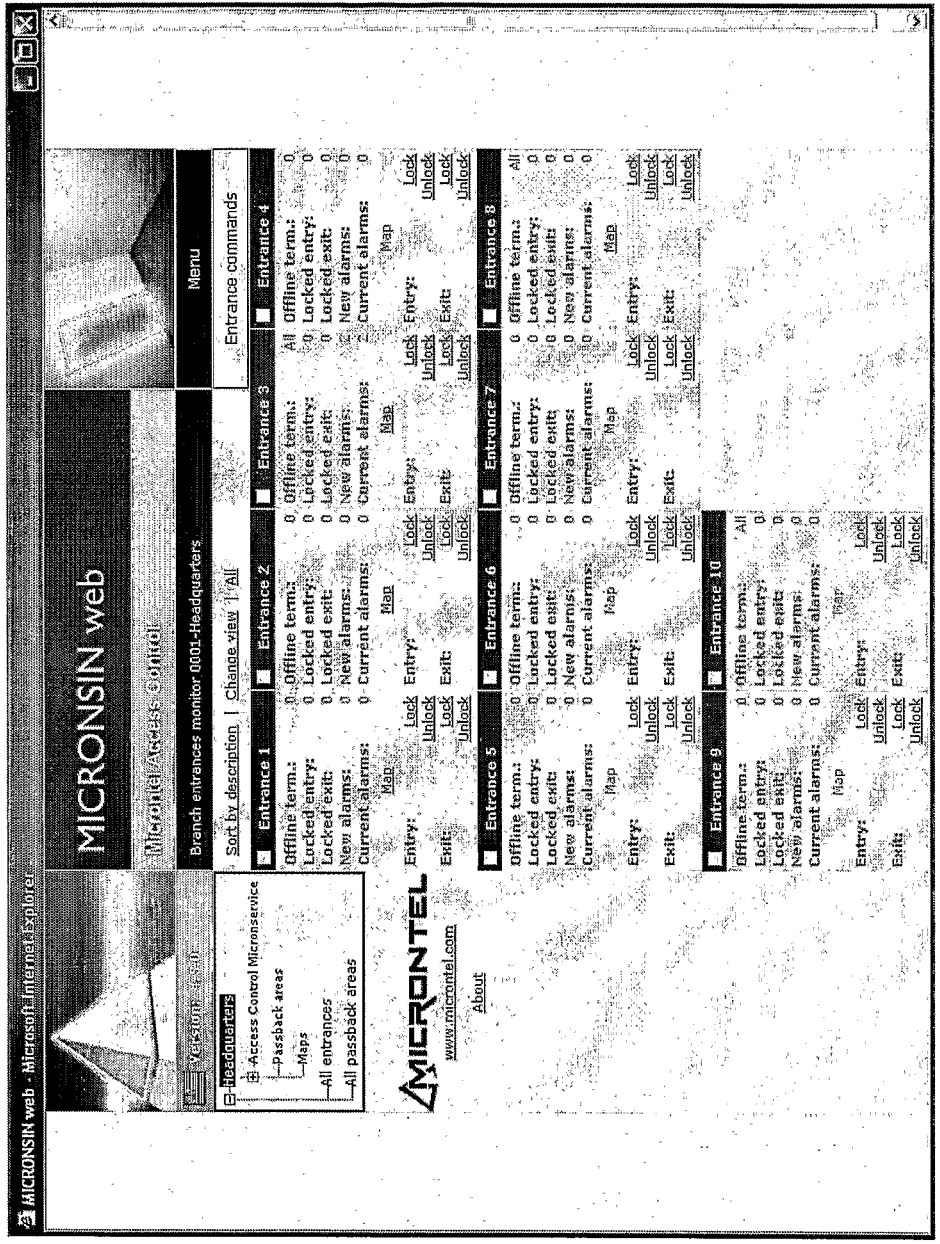
FIG. 3 shows a screen processed by the informatics product implementing the method according to the invention, representing a monitoring situation related to a plurality of entrances.
Figure 4:
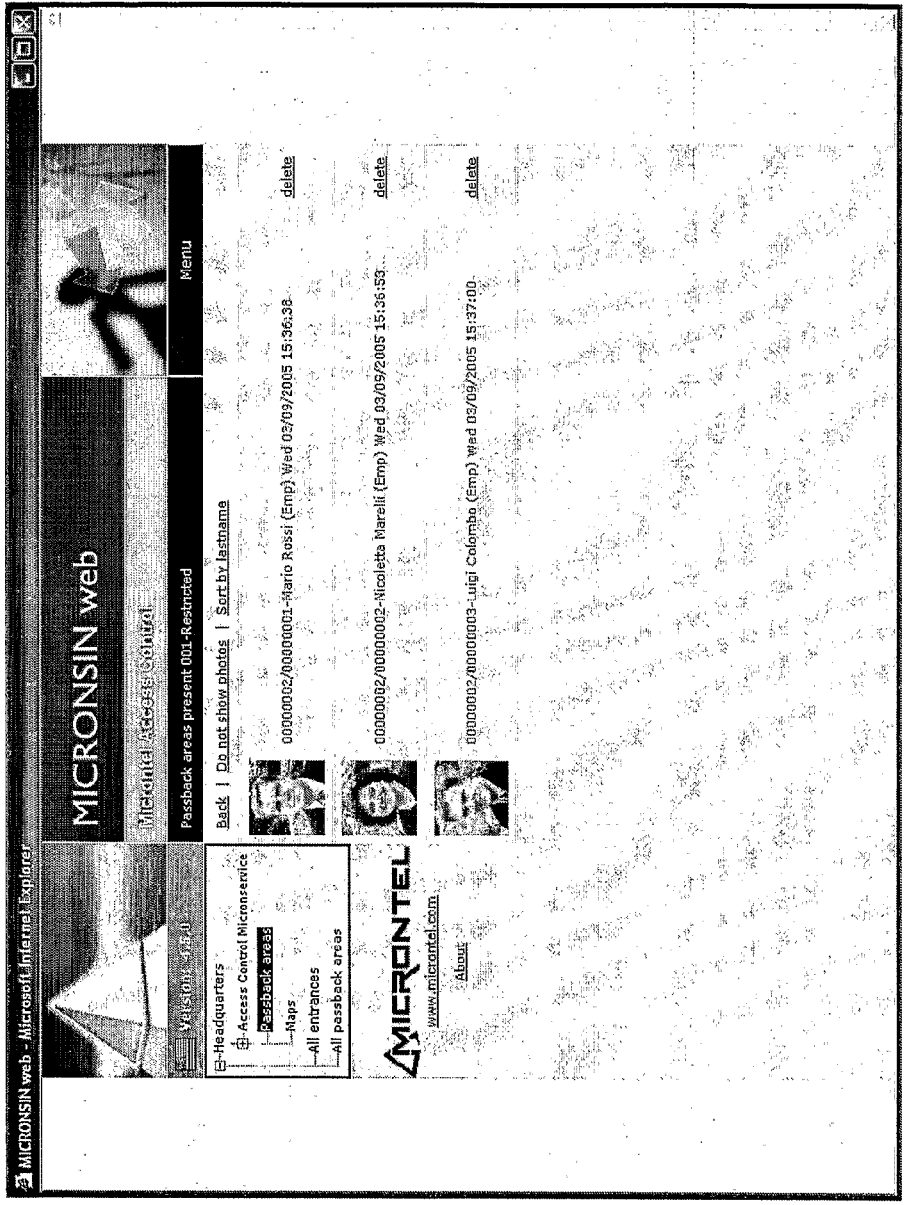
FIG. 4 shows a screen processed by the informatics product implementing the method according to the invention, showing the identity of the people being present inside a certain monitored area.
Figure 5:
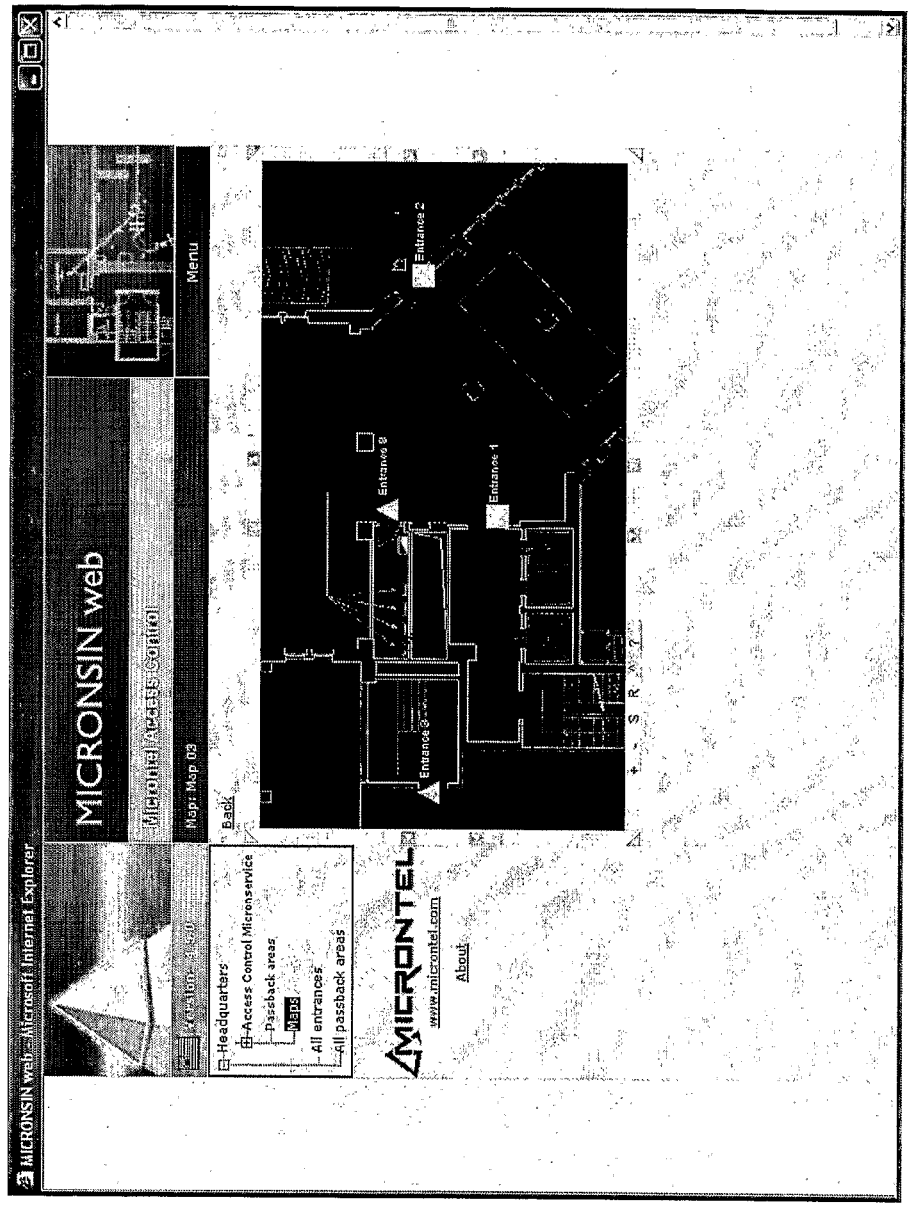
FIG. 5 shows a screen processed by the informatics product implementing the method according to the invention, representing the location of a plurality of access terminals.

The synoptic module 240 allows obtaining a synopsis of the system status as regards events occurring at the access terminals 401, which synopsis is published on the Intranet network 600 through a connection 640 and allows in particular:

- monitoring system-related situations (alarms, door states, etc.), as shown in FIG. 2, which illustrates a screen processed by the informatics product implementing the method according to the invention, representing the monitoring situation at a control passage;
- monitoring connection faults of the access terminals 401, as shown in FIG. 3, which illustrates a screen processed by the informatics product representing the monitoring situation at a plurality of control passages;
- monitoring the people being present in the security areas controlled by using the so-called AntiPassBack functionality, i.e. control and recording of both entries and exits occurring at the security area, as shown in FIG. 4, which illustrates a screen processed by the informatics product representing the identity of a plurality of people being present inside a certain monitored area;
- managing the activation/deactivation of transit through the entrances;
- displaying on maps the sites where the access terminals 401 are located, as shown in FIG. 5.

The cartographic tool has its own navigation and provides X-Y movements and zoom functions; when displaying the maps, the access terminals 401 can be represented with different chromatic effects depending on whether there are alarm conditions or not.

In order to monitor an alarm event, indicated with E in FIG. 1, said synoptic module 240 carries out the following procedure:

- the access terminal 401 acquires, through the input 420, an alarm event E relating to a peripheral digital connection;
- this alarm event E is transferred to the real-time management module 220 over the communication network 700;
- the real-time management module 220 performs a writing step of the alarm event E on the database 310 over the line 223 and, simultaneously, routes over the line 242 a UDP (User Datagram Protocol) packet relating to the alarm event E, intercepted automatically by the synoptic module 240; such UDP protocol differs from the TCP protocol in that the packet can be routed to anyone belonging to a certain listening family and in that it does not require a confirmation response to be sent to the sender;
- the synoptic module 240 performs a stoppage operation or query, of the alarm event E in the database 310, thereby retrieving attached information EA and storing it in a server-side cache 245, or temporary memory, awaiting publication.

As a further example, in order to monitor the people being present in the AntiPassBack controlled security areas, said synoptic module carries out the following procedure:

- the access terminal 401 acquires a clocking in event;
- this clocking in event is transferred to the real-time management module 220 over the communication network 700;
- the real-time management module 220 performs a writing step of the clocking in event on the database 310 over the line 223 and simultaneously routes over the line 242 a UDP (User Datagram Protocol) packet relating to the clocking in event automatically intercepted by the synoptic module 240;
- the synoptic module 240 performs a query of the clocking in event in the database 310, thereby retrieving all attached information and storing it in a server-side cache 245, awaiting publication.

Likewise, said synoptic module 240 carries out the following procedure in order to carry out the monitoring of connection faults of the access terminals 401:

- the real-time management module 220 receives a connection/disconnection event from the system controlling the protocol of the communications network 700;
- the real-time management module 220 performs a writing step of the connection/disconnection event on the database 310 over the line 223 and simultaneously routes over the line 242 a UDP (User Datagram Protocol) packet relating to the connection/disconnection event automatically intercepted by the synoptic module 240;
- the synoptic module 240 performs a query of the connection/disconnection event in the database 310, thereby retrieving all attached information and storing it in its server-side cache 245, awaiting publication.

The access monitoring and management system 100 then carries out the following procedure for controlling the activation/deactivation of transit at the single passages:

- the synoptic module 240 receives the activation/deactivation event, which is set through the Internet browser of one of the user terminals 500;
- said synoptic module 240 then performs a writing operation on the database 310 of the related setting information, or setup, of the passage and sends a setup event to the real-time management module 220 over the line 242, which is a TCP socket for SCADA events;
- the real-time management module 220 performs a query of the event in the database 310 in order to retrieve the passage setup information and outputs to the relevant access terminal 401 a packet suited to the communications network 700 and containing the new operating information of the concerned passage;
- the access terminal 401 conforms automatically to the new setup.

The procedure for publishing the events on monitoring pages on the user terminals 500 is as follows:

- the server-side cache 245 of the synoptic module 240 is unique for monitoring pages of the same type; this resource is made available simultaneously to all users connected to the synoptic module 240. This measure optimizes the system performances when refreshing the monitoring pages, as the memory portion is univocal.
- the publication of the information stored in the cache memory 245 takes place through the Internet services module 210 on the side of the application server 200 and through the Internet browsers on the side of the user terminal 500.

The HTML and Javascript software code published upon the user's request, which is forwarded through the Internet browser in the user terminal 500, is structured in such a way as to permit the visualization of the pages toward the user without any disturbing refreshing effects, thanks to the following characteristics:

- all information subject to change and displayed in clear form consists of browser-side variables;
- the page displayed on the user terminal 500 contains a hidden frame which receives, through a cyclic and automatic refresh, the information that has changed in the server-side cache memory 245 of the synoptic module 240; in said hidden frame a Javascript code is inserted which is capable of processing the information received from the server-side cache memory 245; the hidden frame is refreshed automatically and cyclically;
- at every refresh event, all information received is updated in the variables published in clear form on the user page.

The real-time management module 220 manages:

- the connection from and to the access terminals 400, by using the protocol, preferably the MicronNet proprietary protocol, of the communications network 700;
- the connection from and to the server applications (modules 230 and 240) (TCP/UDP protocols);
- all the events of the access monitoring and management system 100, updating the database 310.

The real-time management module 220 may also be connected to further external systems, not shown, using the TCP/IP and/or UDP protocols.

For web publication, both the access management module 230 and the synoptic module 240 use the Html and Javascript source code only; therefore, no software module being external to the browser is installed locally in the terminals 500, and the presence of Java Virtual Machine is not required. Thus, the terminals 500 carry out the monitoring activity by only using the browser set up for reading Html and Javascript source code.

The above web software modules may be considered as non-invasive with respect to the software configurations of the user terminals 500; their execution does not update any local software modules on the user terminals 500 and does not require the loading of any Java, ActiveX or plug-in code of any kind.

The access management module 230 may output reports in the following standard formats: Adobe "PDF", Microsoft Word "DOC" and "TXT ASCII" with field-delimiting characters.

The real-time management module 220 is constructed as a system service being activated when the application server 200 is started.

The real-time management module 220 may receive personal data update events also from optional personal data import modules connected to external human resource management systems.

The real-time management module 220 may build transfer-type ASCII files for said external human resource management systems.

Advantageously, the above-described access monitoring and management system uses an application server comprising a real-time management module and a synoptic module for publishing, through an Internet Protocol network, events transmitted by the access terminals to said real-time management module over a local network. This ensures the necessary rapidity and allows a timely signaling to or visualization on the user terminals where the monitoring takes place.

According to a further advantageous aspect of the system according to the invention, the use of an application server being compatible with Internet/Intranet networks allows using commercial computers equipped with an Internet browser as user terminals. This low-cost hardware and software equipment is readily available on the market and, given the spread of browser interfaces, the personnel does not usually need to be particularly trained to use the programs. On the user's side, the system according to the invention appears as an application being entirely of the World Wide Web type.

Also advantageously, display and refresh procedures are used which are adapted to obtain a particular rapidity of visualization and refresh. In this frame, the introduction of a synoptic module with a single cache allows attaining optimum refresh performance for all of the user terminals connected to said synoptic module.

Consequently, without prejudice to the principle of the invention, embodiment details and shapes may vary even significantly compared to those described and illustrated herein by way of non-limiting example without departing from the scope of the invention, as defined in the following claims.

The invention claimed is:

1. An access monitoring and management system, comprising:
   at least one set of access terminals associated with a first communication network; and
   an application server also associated with the first communication network for exchanging information, wherein the application server includes
   a real-time management module configured to exchange event information with the set of access terminals over the first communications network; and
   a synoptic module configured to receive the event information from the real-time management module and to publish the event information on one or more monitoring user terminals through an Internet-type network, wherein the synoptic module comprises a cache memory storing temporarily the event information, the cache memory being accessible by the one or more monitoring user terminals for publication, the cache memory being unique for monitoring pages of a same type, wherein the synoptic module is configured to send publication code, HTML, or Javascript code, upon request of a user terminal of the one or more user monitoring terminals, the publication code implementing the steps of assigning all information subject to change and to be displayed in clear form to variables associated with a browser of the user terminal;

providing, on a page displayed on the user terminal, a hidden frame that receives, through cyclic and automatic refresh, information that has changed in the cache memory, the hidden frame including code portions adapted to process the information received from the cache memory and to refresh the hidden frame automatically and cyclically.

2. The system according to claim 1, wherein the application server is associated with a database system and the synoptic module is configured to access an event database in the database system, to write the event information received from the real-time management module in the event database and to retrieve information attached to the event information for its publication on the one or more monitoring user terminals.

3. The system according to claim 2, wherein the management system further comprises an access management module configured to exchange personal data information with the monitoring terminals, the real-time management module, and the database system.

4. The system according to claim 1, wherein the event information exchanged between the synoptic module and the real-time management module is of SCADA (Supervisory Control And Data Acquisition) type.

5. The system according to claim 1, wherein the synoptic module is configured to carry out one or more of the following operations:
monitoring system-related situations;
monitoring connection faults of the access terminals;
monitoring people being present in security areas controlled by using AntiPassBack functionality;
managing activation/deactivation of transit through entrances controlled by the access terminals.

6. The system according to claim 1, wherein the real-time management module is configured to manage:
a bidirectional connection to the access terminals by using a protocol of the first communication network;
a connection to the access management module according to TCP protocol;
a connection to the synoptic module according to TCP/UDP protocols;
events of the access monitoring and management system through operations for updating the database.

7. The system according to claim 1, wherein the real-time management module is connected to at least one external human resource management system for transferring personal data update events.

8. A method for access monitoring and management in a system including at least one set of access terminals and one set of monitoring user terminals, according to which event information relating to events occurring at the access terminals is transmitted through a first communication network associated with the at least one set of access terminals and through an application server associated with the first communication network and with the one set of monitoring user terminals, wherein the application server implements:

a real-time management procedure according to which event information is exchanged with the set of access terminals over the first communication network; and a synoptic procedure for receiving the event information from the real-time management procedure and for publishing the event information on the monitoring user terminals through an Internet-type protocol network, wherein the synoptic procedure includes storing temporarily, in a cache memory, the event information, the cache memory being accessible by the one set of monitoring user terminals for publication, the cache memory being unique for monitoring pages of a same type, wherein the synoptic procedure sends publication code, HTML, or Javascript code, upon request of a user terminal of the one set of user terminals, the publication code implementing the steps of assigning all information subject to change and to be displayed in clear form to variables associated with a browser of the user terminal; and providing, on a page displayed on the user terminal, a hidden frame that receives, through cyclic and automatic refresh, information that has changed in the cache memory, the hidden frame comprising code portions adapted to process the information received from the cache memory and to refresh the hidden frame automatically and cyclically.

9. The method according to claim 8, further comprising an operation for associating a database with the application server, and the synoptic procedure has access to an event database in the database, writes the event information received from the real-time management procedure to the event database, and retrieves information attached to the event information for its publication on the set of monitoring user terminals.

10. The method according to claim 9, wherein the application server also implements an access management procedure for exchanging personal data information with the monitoring terminals, the real-time management procedure, and the database.

11. The method according to claim 8, wherein the access management module is capable of generating report files, in DOC, PDF, and TXT ASCII formats, relating to the event information.

12. The method according to claim 8, wherein the event information exchanged between the synoptic procedure and real-time management procedure is of SCADA type.

13. The method according to claim 8, wherein the synoptic procedure comprises one or more of the following operations:
monitoring system-related situations;
monitoring connection faults of the access terminals;
monitoring people being present in security areas controlled by using AntiPassBack functionality;
managing activation/deactivation of transit through entrances controlled by the access terminals.

14. The method according to claim 8, wherein system-related situations and the access terminals are displayed on a screen and are represented with different chromatic effects depending on whether there are alarm conditions or not.

15. The method according to claim 8, wherein the real-time management procedure manages:
a bidirectional connection to the access terminals by using a protocol of the first communications network;
a connection to the access management procedure according to TCP protocol;

a connection to the synoptic procedure according to TCP/UDP protocols;

events of the access monitoring and management system through operations of updating the database.

16. The method according to claim 8, further comprising monitoring the events by the following operations:

acquiring an alarm and/or clocking in and/or connection/disconnection event at the access terminal through an input related to a peripheral digital connection;

transferring the alarm and/or clocking in and/or connection/disconnection event to the real-time management procedure over the first communications network;

by the real-time management procedure, writing the alarm and/or clocking in and/or connection/disconnection event to the database and, at a same time, routing over the connection to the synoptic procedure a UDP (User Datagram Protocol) packet related to the alarm and/or clocking in and/or connection/disconnection event automatically intercepted by the synoptic procedure, wherein the synoptic procedure also includes operations for querying the alarm and/or clocking in and/or connection/disconnection event in the database, retrieving attached information, and storing the attached information temporarily awaiting a publication operation over the Internet network.

17. The method according to claim 13, wherein the operation for managing the activation/deactivation of transit through entrances controlled by the access terminals comprises the following operations:

sending to the synoptic procedure an activation/deactivation event set through one of the user terminals;

by the synoptic procedure, writing on the database related setup information of the access terminal and sending a setup event to the real-time management procedure; and querying the event in the database in the real-time management procedure to retrieve the setup information and to output to the access terminal a packet suited to the communication network and containing operating information for the terminal.

18. The method according to claim 8, wherein the temporary storage operation for the event information is performed in a unique portion of the cache memory, and the monitoring user terminals interact with the synoptic procedure for publishing the event information on monitoring pages having access to the unique portion of the cache memory.

19. The method according to claim 8, wherein the publication code implements updating, at every refresh event, all information received in the variables associated with the browser of the user terminal and published in clear form.

20. The method according to claim 19, wherein the publication code comprises HTML or Javascript code only, and the publication code is interpreted for publication by the browser of the user terminal.

21. A computer readable medium storing a program that can be loaded into a memory of a computer, and when executed by the computer, causes the computer to execute the method according to claim 8.

22. A method for access monitoring and management in a system including at least one set of access terminals and one set of user terminals, according to which event information relating to events occurring at the access terminals is transmitted through a first communication network associated with the at least one set of access terminals and through an application server associated with the first communication network and with the one set of user terminals, wherein the application server implements:

a real-time management procedure according to which event information is exchanged with the set of access terminals over the first communication network; and a synoptic procedure for receiving the event information from the real-time management procedure and for publishing the event information on the monitoring user terminals through an Internet-type protocol network, wherein the synoptic procedure includes storing temporarily, in a cache memory, the event information, the cache memory being accessible by the one set of monitoring user terminals for publication, the cache memory being unique for monitoring pages of a same type, wherein the synoptic procedure sends publication code, HTML, or Javascript code, upon request of a user terminal of the one set of user terminals, the publication code implementing the steps of assigning all information subject to change and to be displayed in clear form to variables associated with a browser of the user terminal;

providing, on a page displayed on the user terminal, a hidden frame that receives, through cyclic and automatic refresh, information that has changed in the cache memory, the hidden frame comprising code portions adapted to process the information received from the cache memory and to refresh the hidden frame automatically and cyclically; and updating, at every refresh event, all information received in the variables associated with the browser of the user terminal and published in clear form.

* * * * *